Sept. 16, 1924.
A. BOESRUP
1,508,641
CLINKER REMOVER
Filed July 2, 1923
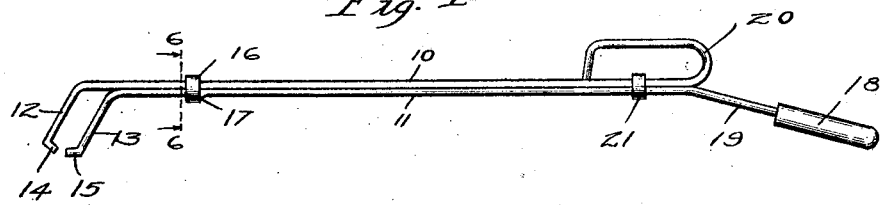
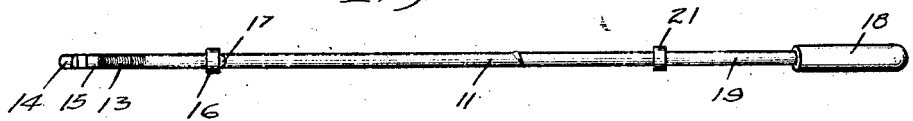
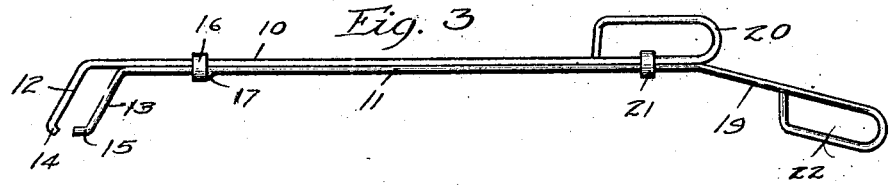
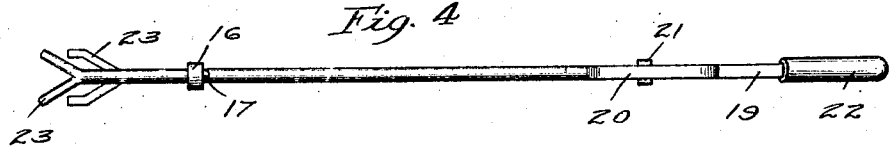
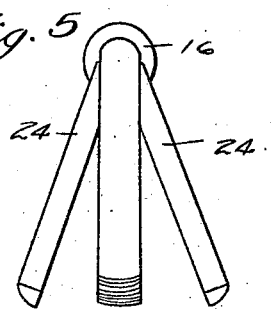
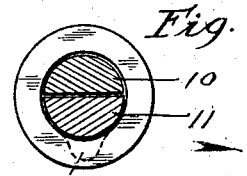
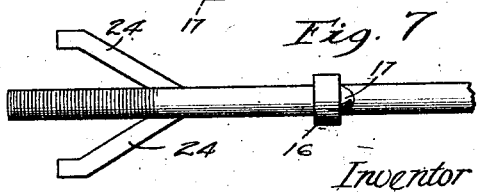
Inventor
Alexander Boesrup
By Blair & Freeman
Atty.

Patented Sept. 16, 1924.

1,508,641

UNITED STATES PATENT OFFICE.

ALEXANDER BOESRUP, OF DES MOINES, IOWA.

CLINKER REMOVER.

Application filed July 2, 1923. Serial No. 649,002.

*To all whom it may concern:*

Be it known that I, ALEXANDER BOESRUP, a citizen of the United States, and a resident of Des Moines, in the county of Polk and State of Iowa, have invented a certain new and useful Clinker Remover, of which the following is a specification.

The object of my invention is to provide a pair of clinker removers of simple, durable and comparatively inexpensive construction.

More particularly, my invention relates to a pair of clinker removers in which the handle elements are so arranged that the clinker remover may be easily manipulated and supported with a minimum amount of effort.

With these and other objects in veiw, my invention consists in the construction, arrangement and combination of the various parts of my device, whereby the objects contemplated are attained, as hereinafter more fully set forth, pointed out in my claim, and illustrated in the accompanying drawings, in which:

Figure 1 is a side elevation of my clinker remover.

Figure 2 is a view of the under side of the same.

Figure 3 shows my clinker remover with the handle elements formed from the iron rods.

Figure 4 shows a slightly modified form of clinker engaging members.

Figure 5 is an end view of the fingers for engaging the clinkers.

Figure 6 is a sectional view taken on the line 6—6 of Figure 1; and

Figure 7 is a view of the upper side of the clinker engaging fingers shown in Figure 5.

In the accompanying drawings, I have used the reference numerals 10 and 11 to indicate generally the two similar members, which form the main part of my clinker remover.

Each of the members 10 and 11 are formed of half-round rod material, as shown in Figure 6 of the drawings.

The adjacent ends of the members 10 and 11 are inclined downwardly and forwardly as at 12 and 13. Each of the free ends of the portions 12 and 13 are bent towards each other, so as to provide gripping fingers 14 and 15, as clearly shown in Figure 1.

In order to hold the two members 10 and 11 together, I place a loop 16 over the members 10 and 11. The members 10 and 11 are capable of sliding movement relative to each other and relative to the loop 16.

In order to limit the amount of movement of the loop 16 relative to the member 11, I provide a lug 17 on the member 11. The lug 17 limits the movement of the loop in one direction, while the downwardly extending portion 13 or finger on the member 11 limits the movement in the other direction.

The member 11 is comparatively longer than the member 10 and is provided with a handle element 18.

In this particular form, I have shown the handle element 18 formed of wood with an opening in its center for receiving one end of the member 11. The member 11 is inclined downwardly and rearwardly, as at 19. The purpose of providing the inclined portion 19 will be hereafter more fully set forth.

A handle loop 20 is formed on the member 10 by bending it upwardly, forwardly and thence downwardly, so as to form a complete loop. A loop member 21 similar to the loop member 16 receives the members 10 and 11 and together with the loop 16 holds the members 10 and 11 in proper position. The amount of movement of the loop member 21 relative to the member 10 is limited by the handle loop 20.

In the particular form shown, the handle loop 20 is engaged by the operator's left hand and the handle element 18 is engaged by the operator's right hand. The positioning of the handle elements in normally spaced relation makes it possible to use the left hand as a fulcrum for manipulating and guiding the remover, as desired.

The fact that I provide the inclined portion 19 adds materially to the ease with which the device may be operated.

The members 10 and 11 are capable of sliding movement relative to each other for spacing the clinker engaging fingers as desired.

In Figure 3 of the drawings, I have shown the member 11 provided with a handle loop 22, which is similar in construction to the handle loop 20.

In Figure 4, I have shown the clinker engaging ends of the members 10 and 11 bifurcated as at 23, so that the fingers may be spread apart for actually forming four points at which the clinker may be engaged.

In Figures 5 and 7, I have shown the member 11 with a bifurcated portion, so as to form the fingers 24. The fact that the ends of the fingers 24 are spread apart makes it possible to engage the clinker at three different points.

It will be understood that my device may be used for engaging packages or boxes when desired and will efficiently operate for that purpose.

I have found that by making the device out of half-round material and holding the members together by a pair of loops gives me a very rigid construction and yet one which can be cheaply manufactured.

Some changes may be made in the arrangement and construction of my device, without departing from the essential features and purposes of my invention, and it is my intention to cover by my claim, any modified form of structure or use of mechanical equivalents, which may be reasonably included within their scope.

I claim as my invention:

A clinker remover comprising a pair of similar members each composed of half round rods with their flat faces resting against each other, each of said members having clinker engaging fingers formed on one of their ends, handle loops formed on the opposite ends of said members, one of said members being longer than the other and having an inclined portion near the handle end thereof, a loop for holding the members together mounted on said members near the finger ends thereof, a stop for limiting the movement of the loop relative to one of the members, a second loop mounted on said members, the handle loop on one of said members being arranged on the opposite sides of said second loop for limiting its movement as and for the purposes stated.

Des Moines, Iowa, January 17, 1923.

ALEXANDER BOESRUP.